2,779,794

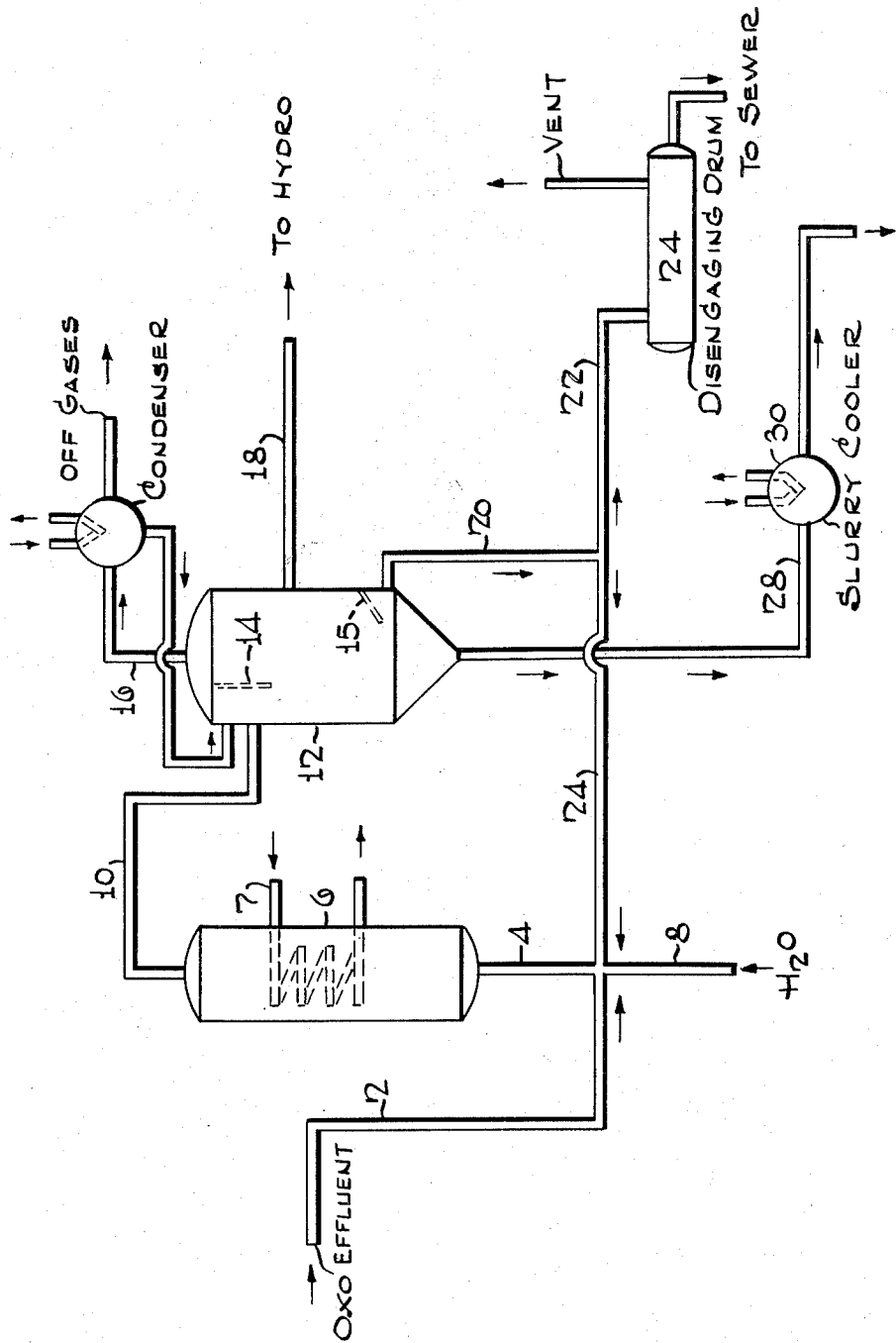

CARBONYLATION OF OLEFINS; WATER DECOBALTING

William E. Catterall, Roselle, N. J., assignor to Esso Research and Engineering Company, a corporation of Delaware Application July 31, 1952, Serial No. 301,895

2 Claims. (Cl. 260—604)

The present invention relates to the preparation of organic compounds by the reaction of carbon monoxide and hydrogen with carbon compounds containing olefinic linkages in the presence of a carbonylation catalyst. More specifically, the present invention relates to the removal and recovery of the cobalt catalyst utilized in the foregoing reaction from the product of the first stage of the cobalt carbonylation reaction for further use in the process.

It is now well known in the art that oxygenated organic compounds may be synthesized from organic compounds containing olefinic linkages by a reaction with carbon monoxide and hydrogen in the presence of a catalyst containing metals of the iron group, preferably as cobalt, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins of 3 to 14 carbon atoms and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalysts in the first stage of the prior art processes are usually added in the form of salts of the catalytically active metal with higher molecular fatty acids, such as stearic, oleic, palmitic, naphthenic, etc., acids. Thus suitable catalysts are, for example, cobalt oleate or naphthenate. These salts are soluble in the liquid olefinic feed and may be supplied to the first stage as hydrocarbon solution or dissolved in the olefin feed. However, oil insoluble forms of cobalt, such as the oxide, carbonate, acetate, formate, basic formate, and the like, may also be employed, either in aqueous solution, suspension or as a slurry.

The synthesis gas mixture fed to the first stage may consist of any ratio of $H_2$ to CO, but preferably these gases are present in about equal volumes. The conditions of reacting olefins with $H_2$ and CO vary somewhat in accordance with the nature of the olefin feed, but the reaction is generally conducted at pressures in the range of about 1500 to 4500 p. s. i. g. and at temperatuers in the range of about 150°–450° F. The ratio of synthesis gas to olefin feed may vary widely; in general, about 2500 to 15,000 cubic feet of $H_2$+CO per barrel of olefin feed are employed.

It will be understood that the "synthesis gas," previously referred to, i. e., a gaseous mixture containing primarily $H_2$ and CO may be made by plurality of conventional methods. For instance, it may be made by the "water gas" reaction, in other words, by reacting say coke with steam. Or, it may be made by "reforming" methane or natural gas with steam, or a mixture of steam and carbon dioxide.

At the end of the first stage, when the desired conversion of olefins to oxygenated compounds has been effected, the product and the unreacted material are generally withdrawn to a catalyst removal zone, where dissolved catalyst is removed from the mixture and it is to this stage that the present principal invention applies.

From the catalyst removal zone the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as a salt, reacts with carbon monoxide under the synthesis conditions to form the metal carbonyl, or hydrocarbonyl. There is basis for the belief that the metal carbonyl itself is the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is, therefore, removed in the catalyst removal, or decobalting zone. One way to remove the cobalt is by a thermal method wherein the accrued product from the first stage is heated to a temperature of from about 300°–350° F. and passed to a decobalting vessel. Conveniently, a steam coil immersed in the liquid to be decobalted is employed. A pressure of from about 100–175 p. s. i. g. is maintained in the decobalting zone by the injection of a gasiform material such as hydrogen, an inert vapor, etc. It is desirable to employ a gasiform material in order that the CO partial pressure be maintained at a relatively low value in the decobalting zone. Periodically, it is necessary to take the decobalter off stream to remove accumulated metallic cobalt to prevent plugging of feed lines and adjacent areas of the decobalting vessel. Furthermore, cobalt metal deposits as a film on the heating means and requires constant removal to prevent plugging of the preheating equipment and surfaces. The removal of these films and deposited cobalt metal is a tedious and difficult process and adds significantly to the cost of the carbonylation reaction. Furthermore, decobalting by this process is rarely complete, and 100 to 500 parts per million of cobalt is usually left in the aldehyde product in continuous operations.

In the decobalting system of the present invention, a considerably more complete removal of cobalt is achieved by adding water in amounts of 2 to 50 percent by volume of the first stage product and carrying out decobalting at temperatures in the range of 250 to 500° F., while maintaining a pressure of from about 50 to 175 pounds per square inch on the decobalting system in the absence of added gases. These decobalting conditions have been shown to remove over 99% of the cobalt dissolved in the crude aldehyde product as it is recovered from the first stage of the process. The cobalt, which is recovered from the process may be in the form of cobalt metal, cobalt formate or basic cobalt formate. Formic acid is one of the secondary reaction products synthesized in the first stage of the process either from the synthesis gas or formed from the oleic, naphthenic or other acid radicals associated with the cobalt in the first stage of the process. In the presence of the added water in the decobalting step, the formic acid is liberated by hydrolysis from formic esters and reacts with the cobalt carbonyl, hydrocarbonyl and other cobalt compounds to produce cobalt formate and basic formate.

In accordance with the present invention, the aldehyde product from the first stage is passed through one or more vessels equipped with heating means such as steam coils to provide the necessary decobalting temperatures. Concomitantly, water is injected with the aldehyde product into the heating vessels and the mixture of water and aldehyde product is maintained in the heating vessel for a period of time adequate to decompose substantially all of the cobalt carbonyl. It has been found advantageous for full realization of complete decobalting that the heating vessel be substantially completely filled with water, the aldehyde, vapors, and surplus water being withdrawn from the top of the vessel. The intimate contact, relatively long contact time and elevated temperature afford opportunity not only for the thermal decobalting, but also, for the hydrolytic effect previously mentioned. The mixture of aldehyde, water, and solid cobalt decomposition products is thereupon passed to a vertical conical settling vessel, preferably provided with baffles to prevent mixing, and the material allowed to stratify. The upper aldehyde layer is withdrawn and passed after cooling and filtration to a hydrogenation zone for conversion into alcohols in a manner known per se.

Two separate streams are withdrawn from the lower part of the settling drum. From the bottom-most part, that is, from the conical bottom, there is withdrawn a slurry which contains the cobalt solids suspended in aqueous solution. This is intermittently or continuously withdrawn, passed through a slurry cooler and the solids recovered by known methods for reconversion into catalyst for the first stage operation. A clear aqueous stream is withdrawn from a higher point of the settling vessel. In one modification of the invention, this stream is passed to a disengaging drum for removal of steam, gases and organic vapors which flash off on pressure reduction from that obtaining in the settling drum down to atmospheric. Thereafter, the water may be passed to the sewer. However, it has been found that this water contains dissolved cobalt formate representing a minor proportion of the total cobalt fed to the system, and discarding the water represents a loss of cobalt. Cobalt recovery from this stream is practical but may not be economical.

In another and preferred embodiment of the invention however, at least a portion of the water withdrawn from the settling drum is recycled to the heater vessel previously mentioned in order to provide the water for the decobalting step. This operation results in improved decobalting by increasing the amount of formate ions present, by maintaining the heating towers filled with water and by reducing the fouling of the heater coils. With the entire water stream recycled to the heaters, the system may be kept in water balance with substantially no discharge of water in addition to the small amount withdrawn with the slurry. Therefore, there is no cobalt loss to a water discharge stream. Water injection rate is thus dictated essentially by the difference between water solubility in the hot decobalter product and the water produced in the Oxo stage; this difference is about 1 to 2 volume percent on the aldehyde.

The advantage of the water recycle method in maintaining the heating towers filled with water is quite important in practical plant operation. For example, an attempt might be made to avoid the water discharge stream merely by refusing to withdraw such a stream. The water input at the feed end of the system would have to be closely controlled to maintain water inventory in the heater and in the settling vessel. However, this involves a series of practical difficulties. First, the temperature level of the heated stream tends to vary considerably as progressive fouling of the heat transfer surfaces occurs and as individual heater vessels in a series are placed into service and removed from service in connection with cleaning. This varies the extent of water vaporization in the heaters, and the water injection rate must be varied accordingly to maintain water balance. A slight pressure upset in the system, such as a momentary drop in pressure, can cause a rapid loss of liquid from the heater vessels because the sudden vaporization of volatile liquid due to pressure reduction creates a large volume of vapor which may mechanically entrain at least a large portion of the remaining liquid out of the vessel. With the very low water injection rate which is necessary in water-balance operation (perhaps only 2% on oil feed) the heater vessels would become filled again with water only very slowly, if at all, unless the rate of water injection is temporarily greatly increased. In commercial plant practice, a reduction in the degree of cobalt removal frequently has been observed to occur following upset conditions, apparently caused by a loss of water level in the heater vessels. The maintenance of water level in the heater vessels has been shown to be so essential to complete decobalting that it has become standard plant practice to fill a heater vessel with water before placing the vessel on stream.

The use of the water recycle system is an automatic and dependable method for maintaining the heater vessels filled with water. If a sudden pressure surge causes dumping of water out of the heaters into the settling drum, the accumulated water in the settling drum is pumped back into the heaters and the water level in the heaters is quickly restored. If for any reason the water injection rate is inadequate to maintain water balance, water inventory is lost from the non-critical settling vessel instead of from the heaters. By making the cross-section of the settling drum large in relation to the cross-section of the heaters, the water level in the settling drum can be made to respond only very slowly to minor deviations from perfect water balance, and only infrequent operating attention is necessary to adjust water injection rate to maintain water balance.

It has been stated, water recycling tends to reduce the amount of cobalt deposited on the heater coils and increases the amount of cobalt obtained as a slurry in the settling vessel. Dissolved cobalt in the aldehyde upon decomposition of carbonyls tends to react preferentially with formate ion to produce insoluble cobalt basic formate. In normal water injection, apparently insufficient acid is available to react with all the cobalt, and therefore, metallic cobalt is precipitated, largely on the heat transfer surfaces. The presence of cobalt formate in the reaction products does not necessarily indicate that excess formic acid is normally available. Water-soluble cobalt formate probably is formed subsequently by reaction of the basic formate with additional formic acid liberated by hydrolysis after the primary decobalting reactions are essentially complete. The recycling of formic acid makes more acid available at the point of carbonyl decomposition and thus enhances the formation of cobalt basic formate which appears mainly in the slurry. Thus the precipitation of metallic cobalt on the hot coils in the heater vessel is reduced accordingly.

The present invention and its application will best be understood from the more detailed description hereinafter, wherein reference will be made to the accompanying drawing, which is a schematic representation of a system suitable for carrying out embodiments of the invention.

The aldehyde synthesis stage, wherein olefins are reacted with a cobalt catalyst, carbon monoxide and hydrogen, has not been included in the diagram, for this is conventional, and the invention centers about the decobalting stage.

Turning now to the figure, a stream of primary reaction products consisting essentially of aldehydes and containing dissolved therein relatively high concentrations of cobalt carbonyl, hydrocarbonyl and also containing secondary reaction products, such as formate esters, resulting from the interaction of alcohols formed in the first stage with formic acid, is pumped via lines 2 and 4 into heating vessel 6. The aldehyde stream is normally at atmospheric temperature and pressure, or may be held under sufficient pressure to avoid separate pumping into the heating vessel. An aqueous stream at atmospheric temperature is simultaneously injected by lines 8 and 4 into heater 6. Though the aqueous stream may be water from any source, preferably a portion thereof at least comprises recycled water from the operation, which contains formate ions, as previously discussed. Heat is supplied to vessel 6 through heating coil 7, and a temperature of 250 to 350° F., and pressure of 100 to 200 p. s. i. g. are maintained within vessel 6. Under such conditions water will constitute the continuous liquid phase in the heater. In the diagram only one heater vessel is shown; it is advantageous to employ multiple heaters. A total of three heaters is convenient, and normally, two of the heating vessels are on stream while the third is idle for cleaning. The flow is preferably upwards in each heater and through the heaters in series, and a total residence time of 0.5 to 4 hours based on oil flow is maintained to achieve maximum conversion of cobalt carbonyl to the solid forms of cobalt.

The effluent from heater 6 comprising aldehydes, water, gases, and solid forms of cobalt in suspension is passed via line 10 to settling vessel 12. Vessel 12 serves to disengage vapors, to settle out water from suspended solids, and to stratify immiscible organic and aqueous phases. The vessel is preferably a vertical vessel equipped with a conical bottom and supplied with one or more vertical baffles 14. The function of the baffles is to isolate liquid inlet turbulence and to force the entire incoming oil flow to the bottom of the oil layer. The oil-vapor interface should be as high as possible without interfering with the vapor disengaging. The cone-included angle at the bottom of the vessel is preferably about 60° and a baffle 15 is advantageously included to prevent solids carry-over in the water discharge stream. Overhead vapors from vessel 12 are withdrawn through line 16 to a condenser, where water and organic vapors are condensed. The mixed-phase condensate is free of cobalt and may be withdrawn as a separate stream, but for simplicity of water balance control and general operation, it may be returned to the settling vessel 12. The uncondensed gases comprise unreacted synthesis gas, gas released from cobalt carbonyl decomposition, and light hydrocarbon gases which may be sent to the burner line. The upper aldehyde layer, containing in solution less than 10, and usually less than 5 parts per million of cobalt is withdrawn through line 18, cooled and, if desired or necessary, filtered free of any suspended particles and passed to the hydrogenation zone and converted to alcohols or set to storage for recovery of aldehydes, or processed in any desired manner.

From the lower portion of settler 12, but above the conical bottom, there is withdrawn through line 20 the supernatant aqueous stream containing in solution small amounts of cobalt and formate ions, and associated as well with minor amounts of organic gases and vapors. The stream is at a temperature of about 320° F. If desired, all or a portion of the aqueous stream may be passed via line 22 to disengaging drum 24. Within drum 24, steam, gases and organic vapors are allowed to flash off at the atmospheric pressures attained in the said drum. The degassed product may then, if desired, be sent to the sewer. In accordance with one embodiment of the invention, however, at least a portion of this formate and hydrogen ion-containing liquid stream is recycled via lines 26 and 4 to heater vessel 6 to supply at least a portion of the water requirements of said zone. Make-up water at atmospheric temperature may be added through line 8 as needed.

The settled cobalt solids are withdrawn as a slurry either continuously or intermittently from the conical bottom settling vessel 12 via line 28. The slurry is generally thick but fluid. Preferably the slurry is passed to a cooling vessel 30 prior to discharge into the slurry accumulation system in order to prevent flashing of the slurry material. One of the advantages of the present system of catalyst removal is the concomitant removal of water and of slurry in two streams. A serious difficulty has been the problem resulting from plugging of the slurry line. In accordance with the described embodiment, if difficulties with plugging occur in the cone or in the slurry cooler, the full water discharge may be taken out of the bottom of the cone instead of the side. The solids concentration in this stream are accordingly much lower than the normal slurry thus minimizing the chances of plugging. The dilute suspension may then be passed to the disengaging drum with or without first passing through the slurry cooler. The solids may be allowed to settle in this atmospheric pressure vessel 24 with the water overflowing to the sewer. Thus, removal of solids may be obtained even when there is plugging without interfering with the continuity of the overall process and thus shut-downs necessary to clean the settling drum 12 are completely avoided.

The extent of decobalting achieved by injecting water and the cobalt carbonyl contaminated aldehyde product into a thermal treating zone followed by a soaking zone may be illustrated by the following data which compare results obtained by the more conventional thermal treating accompanied by purging with an inert gas, and the water treating of the present process.

There is listed in the following Table I the results of five tests which show that the present invention of water injection into the decobalter is superior to the older thermal method described previously. In Test No. 1 the older thermal decobalting method was employed, while in Test Nos. 2–5 varying amounts of water in the liquid phase existed in the decobalting zone as shown in the data appearing in Table I. As these data show, maintaining 0.40 volume percent water based on oil in the liquid phase permitted as satisfactory decobalting as the maintenance of the higher amounts of 2.2 and 7.6 volume percent water in the liquid phase.

*Table I*

| Test No. | 1 | 2 | 3 | 4 | 5 |
|---|---|---|---|---|---|
| Water injection, Vol. Percent on oil | 0 | 2½ | 5 | 10 | |
| Water in liquid phase, Vol. Percent on oil | 0 | 0.40 | 2.2 | 7.6 | 7.0 |
| Decobalter Temperature, ° F.: | | | | | |
| First Tower | 330 | 340 | 340 | 340 | 200 |
| Second Tower | 350 | | | | |
| Settler | 325 | 315 | 315 | 315 | 260 |
| Decobalter pressure, p. s. i. g. | 100–150 | 175 | 175 | 175 | 100 |
| Cobalt Analysis of oil product, p. p. m. soluble [1] | 100–500 | <4 | <4 | <4 | <8 |

[1] Parts per million of cobalt material remaining dissolved after decobalting treatment.

In the foregoing test, as previously indicated, Test No. 1 was carried out employing the older thermal decobalting method with the towers operating in series. In Test No. 2 cobalt metal, cobalt formate and basic cobalt formate separated in the settling drum. Water drawn from the settler contained dissolved cobalt formate plus free formic acid. In Test No. 3, no basic cobalt formate was formed, but otherwise the same results were secured here as were secured in Test No. 2. In Test No. 4 the same results were obtained as obtained in Test No. 3, namely, they were the same as obtained in Test No. 2 except for the fact that no basic cobalt formate was formed. In Test No. 5 the decobalting was achieved by direct steam injection, and it will be noted that equivalent results were obtained here in that the crude aldehyde product, after the decobalting, contained less than 8 parts per million of cobalt material, whereas in Test Nos. 2–4, the aldehyde product contained less than 4 parts per million, following decobalting.

The process of the invention has numerous modifications apparent to those skilled in the art. It is apparent that as the water recycle operation continues, an ever increasing amount of cobalt will become dissolved therein until eventually a substantially saturated solution of cobalt formate is produced. Thus, at least a portion of the aqueous solution may then be advantageously employed in the aldehyde synthesis reaction zone to furnish a portion of the catalytic requirements of that zone. Other and further modifications will occur to those skilled in the art.

For example, a further reduction in the extent of cobalt deposition on the heater vessel heat transfer surfaces can be effected by appropriate control of the water recycle rate. It has been established that rapid precipitation of solid forms of cobalt occurs upon heating the undecobalted aldehyde above about 190° F. The amount of hot water recycled can be adjusted so that the mixture of hot water and cold aldehyde feed in the lower part of heater vessel 6 beneath coil 7 (or in a separate mixing vessel) is above 190° F. Substantial precipitation of the cobalt will occur even in the absence of heat transfer surface in this mixing zone. Further heating to 300° F., may be required only to remove the last traces of oil-soluble cobalt, and therefore, the extent of cobalt deposition on the heat transfer surfaces might be very slight.

What is claimed is:

1. In a carbonylation process wherein a carbon compound containing olefinic linkages is contacted in a carbonylation zone with carbon monoxide and hydrogen in the presence of a cobalt carbonylation catalyst under conditions resulting in the production of an aldehyde product comprising an oxygenated organic compound containing at least one more carbon atom than the initial carbon compound and contaminated by cobalt-containing impurities dissolved therein, and wherein the aldehyde product containing the dissolved cobalt carbonylation catalyst is passed to a decobalting zone where it is heated by indirect means while in admixture with liquid water under pressure at a temperature of about 250° to 500° F. in order to decompose the dissolved cobalt impurities, the improvement which comprises passing a mixture of heated aldehyde product, water and decomposed cobalt-impurities from the decobalting zone to a settling zone, adding water to the decobalting zone in an amount sufficient to keep the latter substantially completely filled with liquid, withdrawing an aldehyde product substantially completely free of dissolved cobalt from an upper portion of the settling zone, withdrawing a slurry of cobalt-containing solids from a bottom portion of the settling zone, separately withdrawing an aqueous stream from an intermediate portion of the settling zone, and recycling at least a portion of said aqueous stream from the settling zone to the decobalting zone.

2. In a carbonylation process wherein an olefin of 3 to 14 carbon atoms is contacted in an aldehyde synthesis zone with carbon monoxide and hydrogen in the presence of a cobalt carbonylation catalyst under conditions resulting in the production of an aldehyde product comprising an aldehyde having one more carbon atom than the initial olefin and contaminated by cobalt carbonyl dissolved therein, the aldehyde product containing the dissolved cobalt carbonyl is then passed to at least one of a plurality of decobalting zones for removal of cobalt in the presence of water, and individual decobalting zones are periodically placed into and removed from service in connection with cleaning, the improvement which comprises substantially filling the decobalting zone with liquid water before passing the cobalt-contaminated aldehyde product thereto, then passing the cobalt-contaminated aldehyde product upwardly into the bottom portion of the water-filled decobalting zone to form a liquid water-aldehyde mixture wherein water is the continuous phase, heating the resulting liquid water-aldehyde mixture by indirect heat exchange in an intermediate portion only of the decobalting zone to a temperature of 250° to 350° F. at a pressure of 100 to 200 p. s. i. g., maintaining the water-aldehyde mixture in the decobalting zone at said temperature and pressure for a period of 0.5 to 4 hours based on oil flow in order to hydrolyze formic esters and decompose cobalt carbonyl, passing a hot mixture comprising aldehyde product, cobalt-comprising material and water from an upper portion of the decobalting zone to a vertically disposed settling zone having a cross-section relatively large in relation to the cross-section of the decobalting zone, withdrawing a substantially completely cobalt-free aldehyde product from an upper portion of the settling zone, withdrawing a slurry of cobalt-comprising solids from the bottom portion of the settling zone, separately withdrawing a hot, essentially solids-free aqueous stream containing formate ions from an intermediate portion of the settling zone, recycling at least a portion of the hot aqueous stream removed from the settling zone to the bottom portion of the decobalting zone beneath the intermediate, indirect heat transfer portion thereof, mixing said recycled hot water with incoming aldehyde product at a temperature above 190° F. to precipitate cobalt from the incoming product in the bottom portion of the decobalting zone, further passing additional water at atmospheric temperature to the bottom portion of the decobalting zone in an amount sufficient to keep the decobalting zone substantially completely filled with liquid, cooling the withdrawn cobalt-containing slurry, and passing the cooled slurry to a cobalt recovery zone.

References Cited in the file of this patent
UNITED STATES PATENTS

| | | |
|---|---|---|
| 2,679,534 | Koontz | May 25, 1954 |
| 2,686,206 | Cerveny | Aug. 10, 1954 |

OTHER REFERENCES

| | | |
|---|---|---|
| 69,370 | Netherlands | Jan. 15, 1925 |
| 660,737 | Great Britain | Nov. 14, 1951 |